(12) United States Patent
Choo

(10) Patent No.: US 9,296,626 B2
(45) Date of Patent: Mar. 29, 2016

(54) METHOD FOR PRODUCING AN ORGANIC-INORGANIC HYBRID SORBENT BY IMPREGNATING AN OXIDE INTO NANOPORES OF ACTIVATED CARBON AND USE THEREOF IN WATER TREATMENT

(75) Inventor: Kwang Ho Choo, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 118 days.

(21) Appl. No.: 13/980,900

(22) PCT Filed: Jan. 20, 2012

(86) PCT No.: PCT/KR2012/000569
§ 371 (c)(1),
(2), (4) Date: Oct. 7, 2013

(87) PCT Pub. No.: WO2012/099445
PCT Pub. Date: Jul. 26, 2012

(65) Prior Publication Data
US 2014/0021139 A1   Jan. 23, 2014

(30) Foreign Application Priority Data

Jan. 21, 2011 (KR) .................. 10-2011-0006454

(51) Int. Cl.
| | |
|---|---|
| C02F 1/28 | (2006.01) |
| B01J 20/06 | (2006.01) |
| B01J 20/08 | (2006.01) |
| B01J 20/18 | (2006.01) |
| B01J 20/20 | (2006.01) |
| B01J 20/32 | (2006.01) |
| C02F 101/30 | (2006.01) |

(52) U.S. Cl.
CPC ............ *C02F 1/288* (2013.01); *B01J 20/06* (2013.01); *B01J 20/08* (2013.01); *B01J 20/18* (2013.01); *B01J 20/20* (2013.01); *B01J 20/3204* (2013.01); *B01J 20/3236* (2013.01); *C02F 1/281* (2013.01); *C02F 1/283* (2013.01); *C02F 2101/305* (2013.01)

(58) Field of Classification Search
None
See application file for complete search history.

(56) References Cited

U.S. PATENT DOCUMENTS

| | | | | |
|---|---|---|---|---|
| 3,803,033 | A * | 4/1974 | Sutherland | 210/673 |
| 4,596,659 | A * | 6/1986 | Nomura et al. | 210/669 |
| 4,717,554 | A * | 1/1988 | Nomura et al. | 210/670 |
| 5,460,791 | A * | 10/1995 | Shirato et al. | 423/6 |

(Continued)

FOREIGN PATENT DOCUMENTS

| | | |
|---|---|---|
| JP | 2005-137973 | 6/2005 |
| JP | 2005-177534 | 7/2005 |
| KR | 2003-0015599 | * 2/2003 |

OTHER PUBLICATIONS

International Search Report and the Written Opinion Dated Jul. 2, 2012 From the Korean Intellectual Property Office Re. Application No. PCT/KR2012/000569 and Its Translation Into English.

*Primary Examiner* — Chester Barry

(57) ABSTRACT

This invention relates to a method of manufacturing an organic-inorganic composite hybrid adsorbent by impregnating activated carbon nanopores with an oxide and a water treatment method using the same, and particularly, to an adsorbent including a porous adsorbent and ferrihydrite, goethite, hematite or magnetite incorporated into the porous adsorbent, and a manufacturing method thereof.

4 Claims, 12 Drawing Sheets

(56) References Cited

U.S. PATENT DOCUMENTS

| | | | |
|---|---|---|---|
| 5,904,832 A * | 5/1999 | Clifford et al. | 205/756 |
| 7,722,843 B1 * | 5/2010 | Srinivasachar | 423/210 |
| 7,807,606 B2 * | 10/2010 | Tranter | B01J 20/0229 502/414 |
| 8,097,185 B2 * | 1/2012 | Miller et al. | 252/506 |
| 8,158,006 B2 * | 4/2012 | Hata et al. | 210/670 |
| 8,551,617 B2 * | 10/2013 | Taboada-Serrano et al. | 428/403 |
| 2008/0271600 A1 | 11/2008 | Schlegel et al. | |
| 2009/0065436 A1 * | 3/2009 | Kalayci | B01D 39/1623 210/679 |
| 2014/0298996 A1 * | 10/2014 | Meirav | B01D 53/04 96/154 |

* cited by examiner

Figure 2A
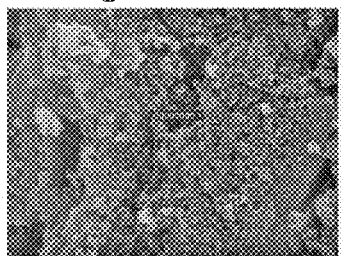
| Element | Weight% | Atomic% |
|---|---|---|
| C | 77.55 | 84.17 |
| O | 15.63 | 12.74 |
| Si | 5.49 | 2.55 |
| S | 1.33 | 0.54 |
| Totals | 100.00 | |
Figure 2B
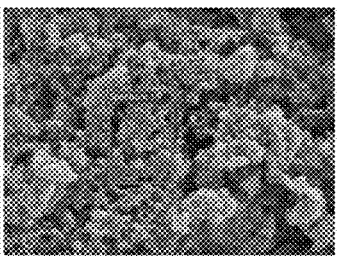
| Element | Weight% | Atomic% |
|---|---|---|
| C | 81.83 | 86.63 |
| O | 15.11 | 12.01 |
| Si | 2.56 | 1.16 |
| S | 0.50 | 0.20 |
| Totals | 100.00 | |
Figure 2C
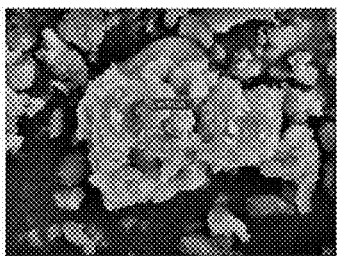
| Element | Weight% | Atomic% |
|---|---|---|
| C | 4.03 | 9.99 |
| O | 26.84 | 50.00 |
| Na | 4.08 | 5.28 |
| Fe | 65.05 | 34.72 |
| Totals | 100.00 | |
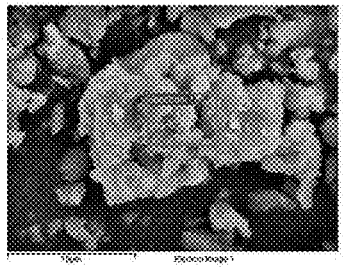
| Element | Weight% | Atomic% |
|---|---|---|
| C | 66.56 | 76.78 |
| O | 19.75 | 17.10 |
| Na | 7.20 | 4.34 |
| S | 0.92 | 0.40 |
| Fe | 5.57 | 1.38 |
| Totals | 100.00 | |
Figure 2D
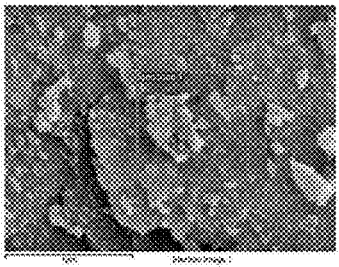
| Element | Weight% | Atomic% |
|---|---|---|
| C | 3.59 | 8.67 |
| O | 30.40 | 55.15 |
| Na | 2.12 | 2.68 |
| Al | 0.54 | 0.58 |
| Fe | 63.35 | 32.92 |
| Totals | 100.00 | |
Figure 2E
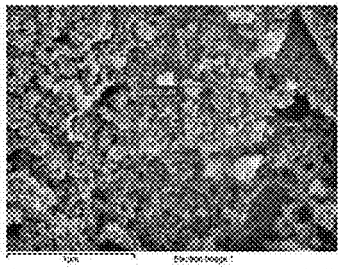
| Element | Weight% | Atomic% |
|---|---|---|
| C | 83.56 | 88.73 |
| O | 12.65 | 10.08 |
| Si | 0.60 | 0.27 |
| S | 1.09 | 0.44 |
| Fe | 2.09 | 0.48 |
| Totals | 100.00 | |
Figure 2F

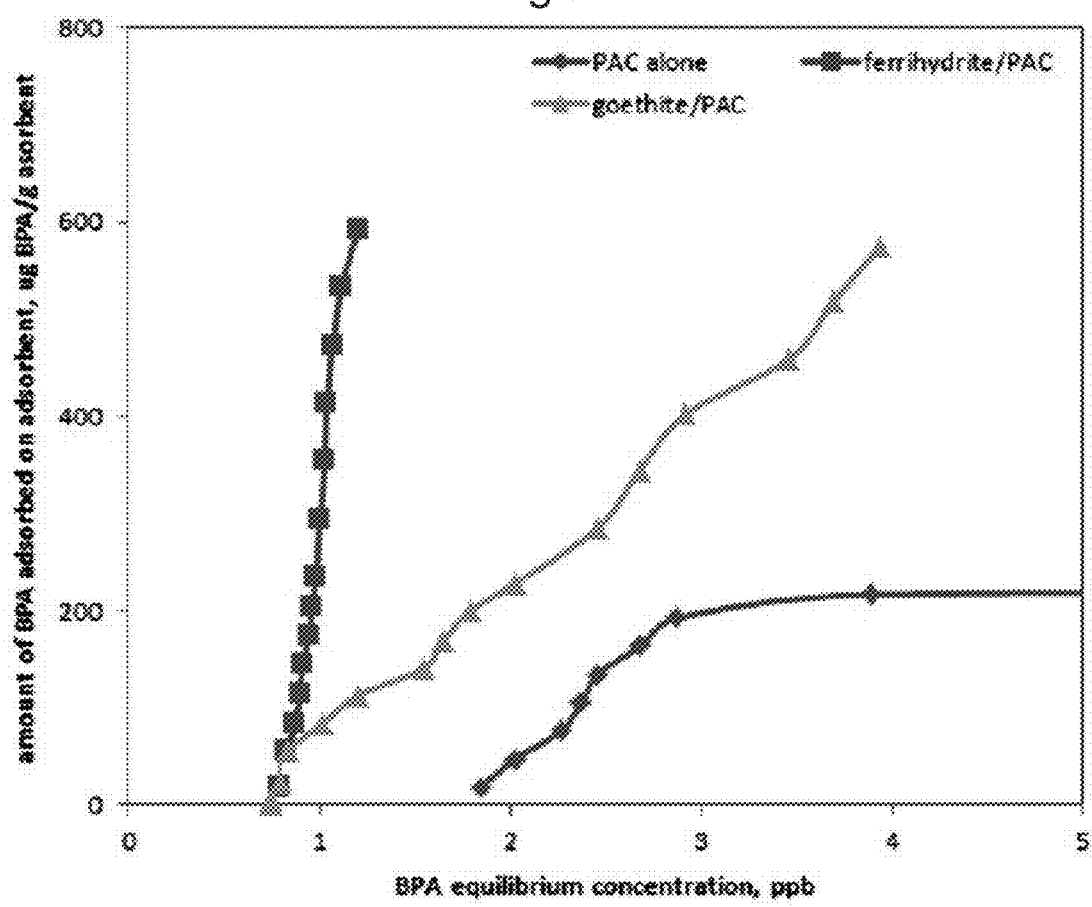

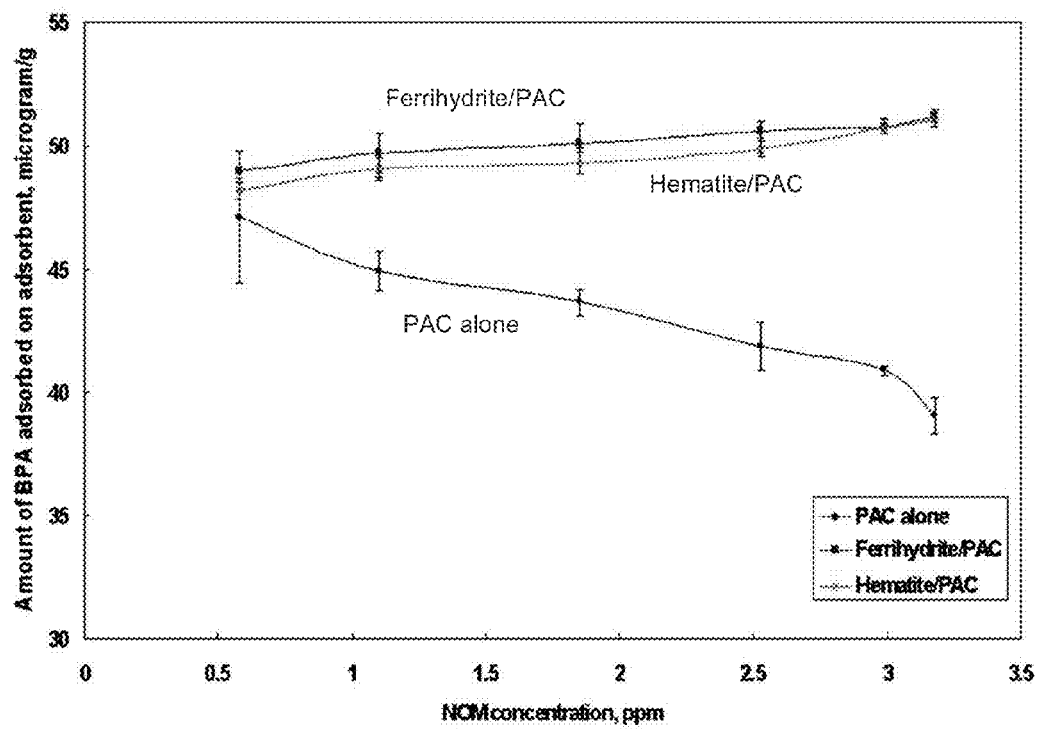

Figure 8A
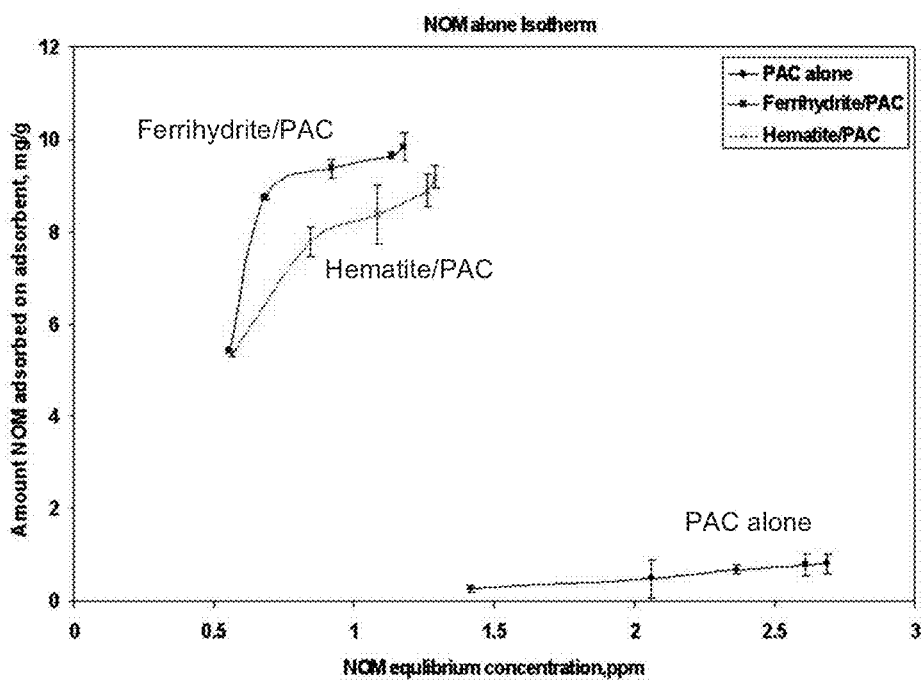
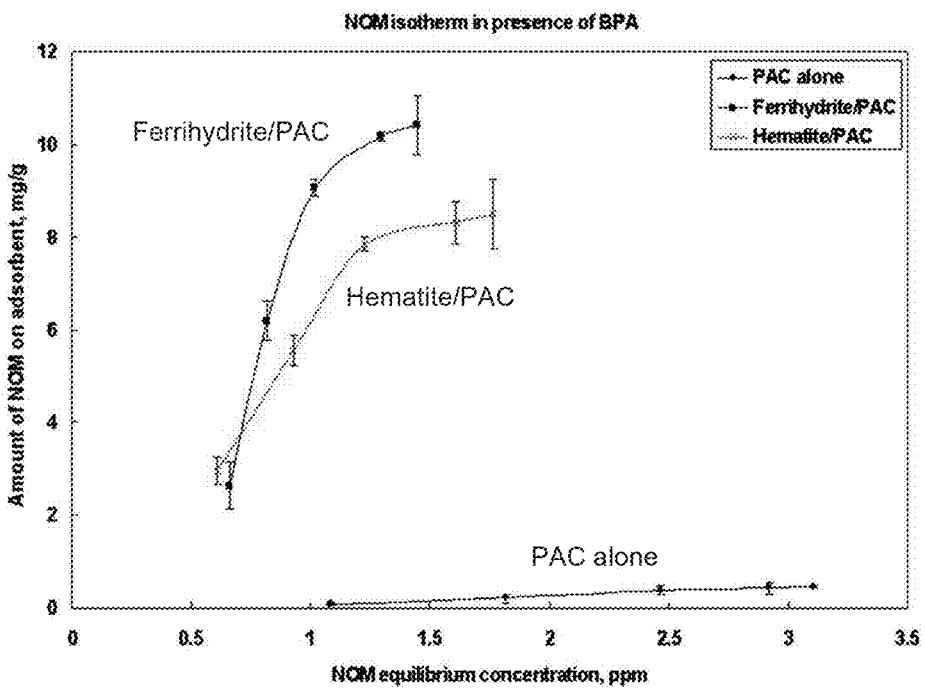
Figure 8B

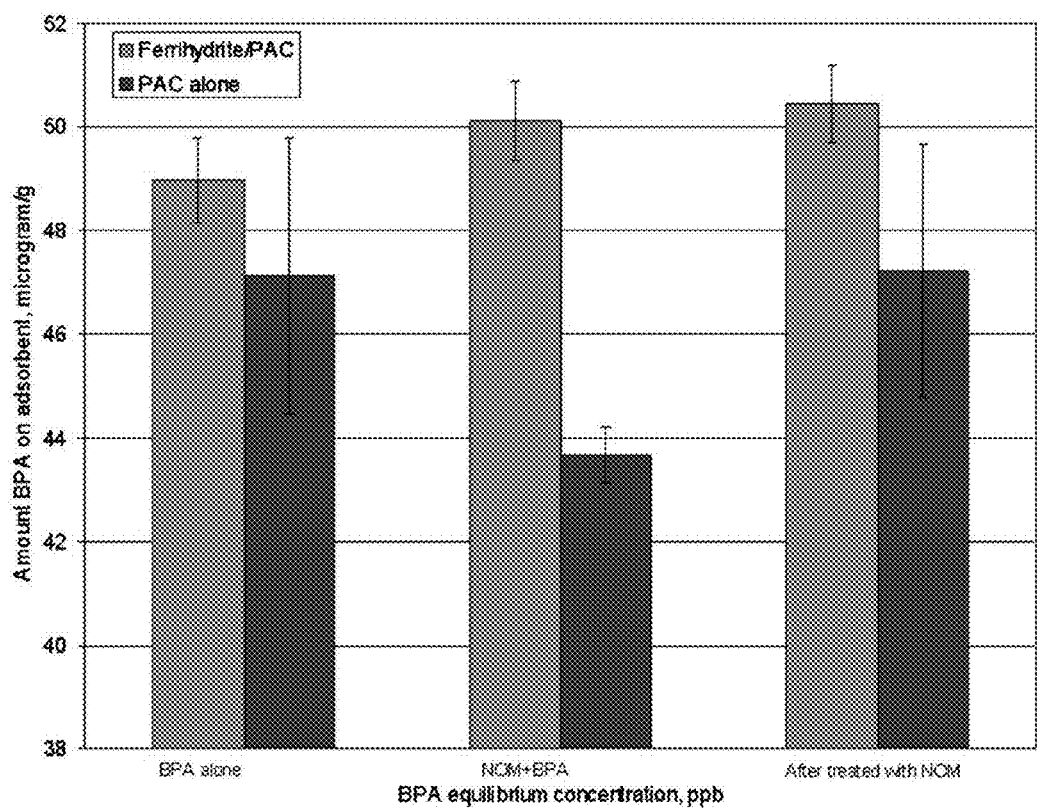

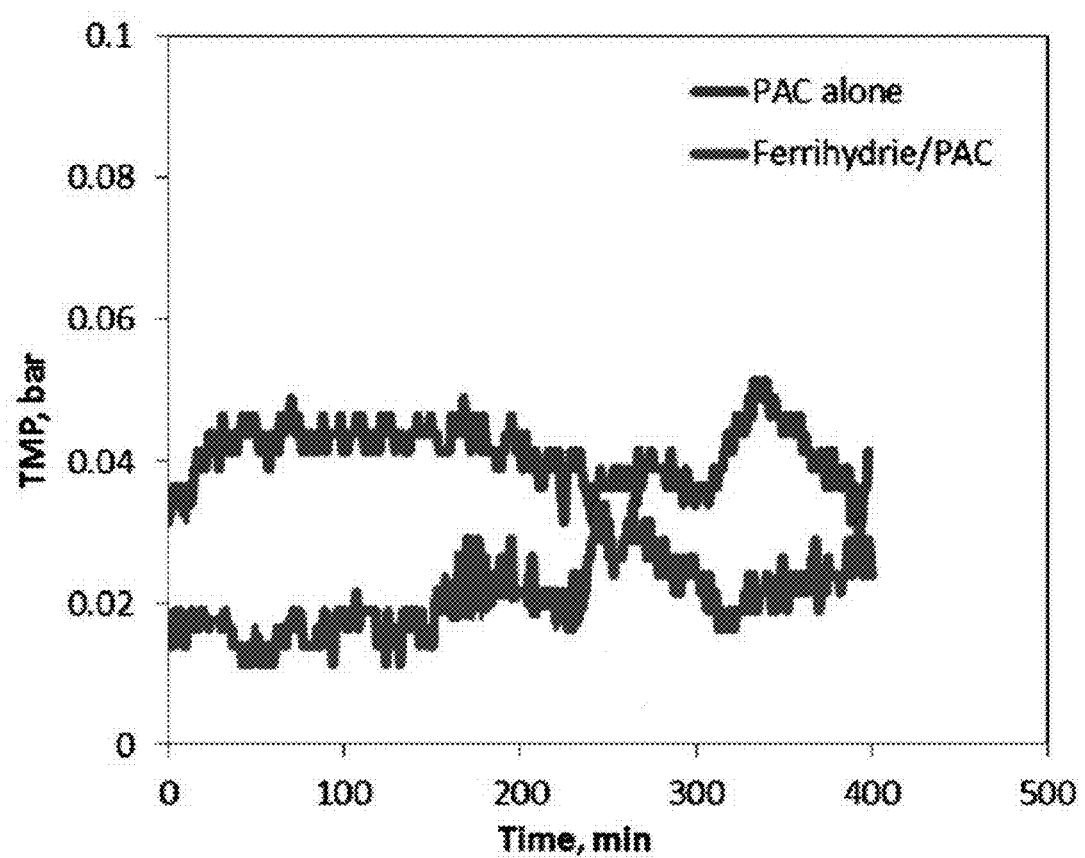

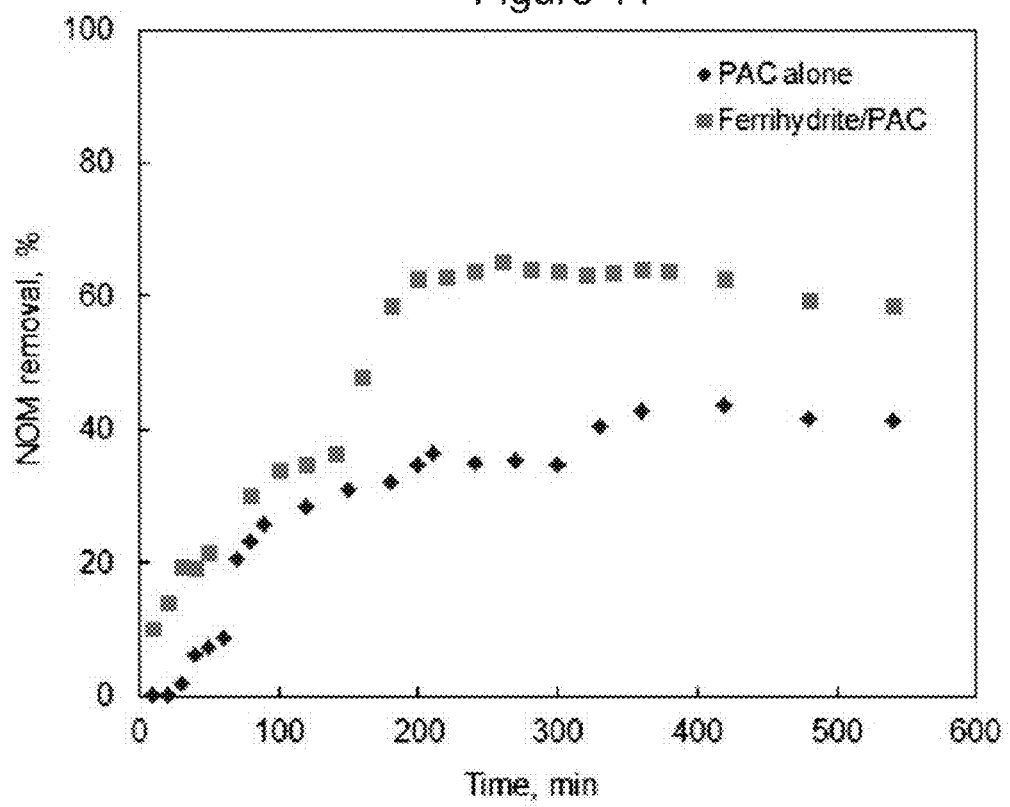

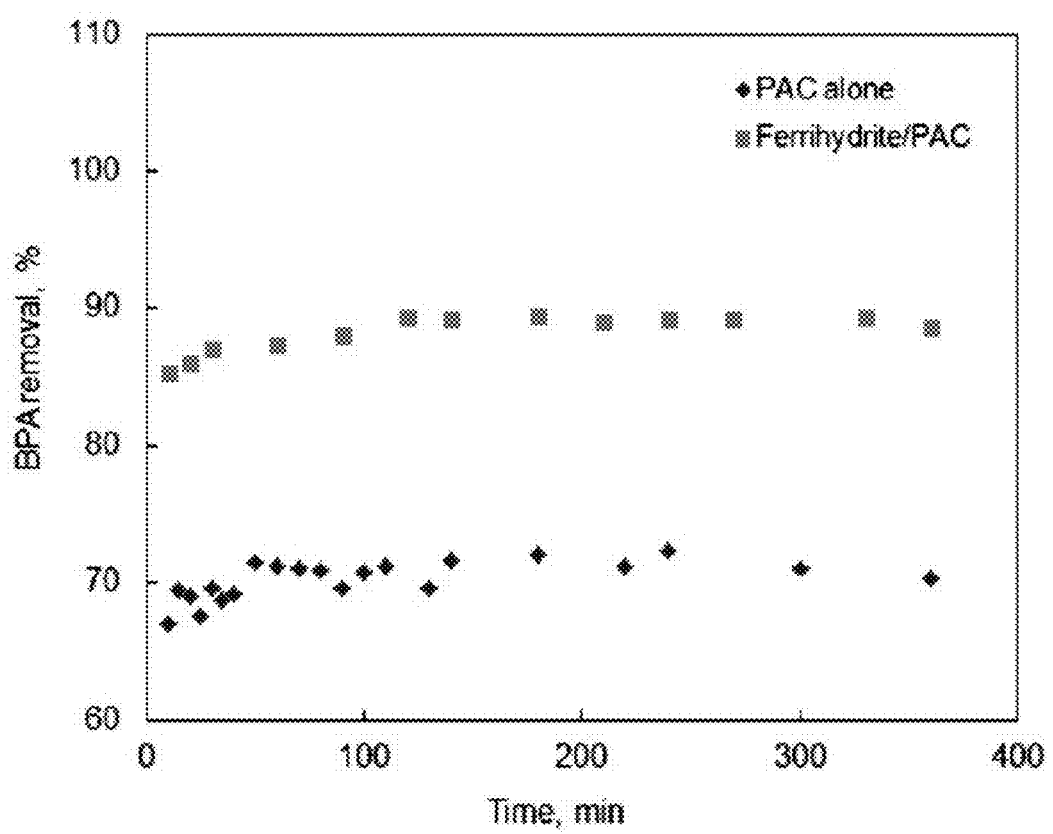

METHOD FOR PRODUCING AN ORGANIC-INORGANIC HYBRID SORBENT BY IMPREGNATING AN OXIDE INTO NANOPORES OF ACTIVATED CARBON AND USE THEREOF IN WATER TREATMENT

RELATED APPLICATIONS

This application is a National Phase of PCT Patent Application No. PCT/KR2012/000569 having International filing date of Jan. 20, 2012, which claims the benefit of priority of Korean Patent Application No. 10-2011-0006454 filed on Jan. 21, 2011. The contents of the above applications are all incorporated by reference as if fully set forth herein in their entirety.

FIELD AND BACKGROUND OF THE INVENTION

The present invention relates to a method of manufacturing an organic-inorganic composite hybrid adsorbent by impregnating activated carbon nanopores with an oxide and a water treatment method using the same.

As the industry has developed, the emergence and production of new trace hazardous materials is steadily increasing, and thus there is a growing concern for the seriousness and risk of environmental pollution due to these hazardous materials. In environmental technology developed countries including the U.S.A., attempts have been made to make the standards for allowable residual concentrations of trace hazardous materials in the environment more rigorous and to reinforce oversight of new trace hazardous materials, including establishment of analytical methods and evaluation of risk for the same, but research into integrated control management and processing systems is insufficient in Korea. Particularly, trace hazardous materials in the effluent of industrial wastewater treatment plants frequently cause water pollution problems.

Taking into consideration the reality of Korea in which water discharged from upstream areas is used as a water source for downstream areas, control of trace hazardous materials is urgently required to ensure the good quality of water sources. Among such trace hazardous materials, trace organic materials which are recently problematic in Korea include endocrine disruptors (EDCs), including hexachlorobenzene, bisphenol A, benzene, etc.

The endocrine disruptors which are chemical materials that disturb the normal functions of endocrine systems include agrichemicals such as pesticides, including DDT; conventional organochlorine chemicals such as dioxins or PCBs (polychlorinated biphenyls); phthalate, bisphenol A, polyphenylethoxylate and so on, which are associated with materials, plasticizers or detergents for use in plastic products; and some heavy metals, etc. Unlike biogenic hormones, such endocrine disruptors do not easily decompose, are stable and remain in the environment and in vivo for several years, and may become concentrated in body fat and tissue. Exposure to environmental hormones reduces the number of sperm and causes reproductive dysfunction, mutagenesis, hermaphroditism, cancer, etc.

Methods of controlling organic and inorganic trace pollutants include chemical flocculation, biological treatment, an advanced oxidation process (AOP), a membrane separation process, adsorption, etc.

Chemical flocculation is a process of inducing flocculation by the addition of a polymeric flocculant or an inorganic salt, and the removal rate of particulate materials due to flocculation amounts to about 40% at maximum, but perchlorates or endocrine disruptors do not form condensation nuclei in a liquid phase, and thus are not removed via flocculation, which is undesirable.

Biological treatment is a process of oxidizing and reducing non-degradable materials using cometabolism of microorganisms, and mainly uses aerobic activated sludge, trickling filtration, and anaerobic sludge. Also, the main mechanism for removing perchlorates using biological treatment is known to appropriately adjust the dissolved oxygen concentration and nitrates, but the main mechanism for removing endocrine disruptors using biological treatment is reported to be based on their adsorption onto microorganisms and colloids rather than their decomposition by microorganisms, and thus the accumulation of environmental hormones in microorganisms is regarded as problematic. As endocrine materials are concentrated in the sludge, the cost required to treat such sludge is increasing.

AOP is a process of forming a hydroxyl radical (OH) which can mineralize organic materials in water or to partially decompose such materials, and is mainly exemplified by ozone oxidation, Fenton oxidation, hydrogen peroxide oxidation, photooxidation, photocatalytic degradation, etc. However, AOP is problematic because byproducts are formed in the course of oxidative decomposition and cases where the toxicity of such byproducts is higher than that of original materials are reported, and this process is unsuitable as a one-step process for actual use.

Among the various treatment methods of organic and inorganic pollutants, a combination process of adsorption and separation is recently receiving attention. The adsorption process using activated carbon is widely utilized in terms of controlling a variety of organic and inorganic pollutants, and the pretreatment process using ion exchange resins is effective at controlling cations or anions in water. Furthermore, the separation process using membranes is very effective at removing a variety of pollutants from feed water without phase change.

However, most endocrine disruptors have a very low molecular weight of about 300 Da and need a high-pressure membrane such as a nanofilration (NF) membrane or a reverse osmosis (RO) membrane to separate them using the membrane separation process alone, but the high-pressure membrane incurs high pressure loss and low membrane permeability, undesirably increasing the cost of operation.

Therefore, the separation process is mainly used in combination with a pretreatment process such as the adsorption process, and the adsorption process using activated carbon functions to adsorb a variety of organic and inorganic pollutants in addition to the trace pollutants in water, and thus requires the preparation of a selective adsorbent for pollutants having low molecular weight, and research thereto is still insufficient.

Culminating in the present invention, intensive and thorough research into methods of manufacturing organic-inorganic composite hybrid adsorbents by impregnating activated carbon nanopores with ferrihydrite, goethite, hematite or magnetite, carried out by the present inventors, resulted in the finding that the manufactured adsorbent having impregnated iron oxide may more effectively remove natural organic matter having high molecular weight as well as trace pollutants having low molecular weight in water, and may be recycled using a simpler recycling method, as compared to conventional techniques.

SUMMARY OF THE INVENTION

An object of the present invention is to provide a method of manufacturing an organic-inorganic composite hybrid adsorbent by impregnating activated carbon nanopores with ferrihydrite, goethite, hematite or magnetite and a water treatment method using the same, wherein the resulting adsorbent having impregnated iron oxide is capable of effectively removing natural organic matter having high molecular weight as well as trace pollutants having low molecular weight.

In order to accomplish the above object, an aspect of the present invention provides an adsorbent comprising a porous adsorbent and ferrihydrite, goethite, hematite or magnetite impregnated into the porous adsorbent.

As used herein, the term "porous adsorbent" means an adsorbent containing numerous pores therein, and may include any one or more selected from the group consisting of powdered activated carbon (PAC), zeolite and alumina in the present invention.

Because the porous adsorbent has numerous pores therein, the surface area thereof is large, and ferrihydrite, goethite, hematite or magnetite may be adsorbed to the surface thereof.

As used herein, the terms "ferrihydrite," "goethite," "hematite" and "magnetite" indicate various forms of iron oxide. The term "ferrihydrite" indicates an iron oxide represented by $Fe_5(OH)_2 \cdot 4H_2O$ which shows a dark reddish brown color with a large specific surface area and low crystallinity, and the term "goethite" indicates an iron oxide represented by FeO(OH) which shows brown, reddish brown, yellowish brown and blackish brown colors with a needle crystalline structure. Also, the term "hematite" indicates an iron oxide represented by $Fe_2O_3$ which shows opacity and light gray, iron black and reddish brown colors with a crystalline structure. The term "magnetite" refers to triiron tetraoxide represented by $Fe_3O_4$, and is a ferromagnetic material.

The adsorbent according to the present invention is configured such that ferrihydrite, goethite, hematite or magnetite is adsorbed to the porous adsorbent. Although the porous adsorbent alone may remove BPA and organic materials, the case where ferrihydrite, goethite, hematite or magnetite is adsorbed according to the present invention may result in an increase of 50 times or more in terms of the removal rate as compared to when the porous adsorbent is used alone.

Furthermore, the adsorbent according to the present invention is exposed under conditions of pH 12 or more to easily recycle the adsorbent used, so that the adsorbed pollutants are desorbed and the adsorbent may be recovered and reused.

In the present invention, the adsorbent has 0.4-0.6 g of iron per 1 g of the porous adsorbent.

Also, the recycled adsorbent is able to adsorb organic materials (endocrine disruptors, volative organic compounds, halogenated compounds) present in municipal wastewater, industrial wastewater, contaminated soil, and groundwater so as to enable rapid water treatment.

Another aspect of the present invention provides a method of manufacturing an adsorbent impregnated with ferrihydrite, goethite, hematite or magnetite, comprising 1) allowing a porous adsorbent to stand in a ferric solution; 2) separating the porous adsorbent from the solution and washing it; 3) exposing the porous adsorbent to an alkaline solution to form a precipitate in pores thereof; and 4) recovering the adsorbent, and performing heat treatment, washing and drying.

Step 1) is allowing the porous adsorbent to stand in the ferric solution, so that iron ions are moved into the pores of the porous adsorbent. This step is preferably performed for 1 hr.

Step 2) is separating the porous adsorbent from the solution and washing it before the subsequent titration step. The drying temperature is preferably set to 40° C.

Step 3) is exposing the porous adsorbent to the alkaline solution to form the precipitate in the pores thereof, so that the porous adsorbent is titrated with the alkaline solution and thus the hydroxyl group is moved into the pores of the porous adsorbent and reacts with iron ions, thus forming iron oxide.

As such, in the case where ferrihydrite is formed, titration is performed at pH 7-8 using NaOH, and in the case where goethite is formed, titration is performed at pH 11-12 using NaOH. In the case where hematite is formed, titration is performed at pH 6.5 using NaOH and oxalic acid.

In the case where magnetite is formed, titration is performed at pH 7-8 using NaOH.

Step 4) is recovering the adsorbent and performing heat treatment, washing and drying, and the heat treatment is preferably conducted in the temperature range from room temperature (25° C.) to 90° C. in the presence of sufficient amounts of water. Thereby, a novel organic-inorganic composite hybrid adsorbent comprising activated carbon pores impregnated with a variety of iron oxides, such as ferrihydrite, hematite, goethite or magnetite may be obtained.

As is apparent from the results of analysis of the adsorbent according to the present invention using X-ray diffraction (XRD), scanning electron microscopy (SEM)-energy dispersive spectroscopy (EDS), and Fourier transform-infrared spectroscopy (FT-IR), the pores of the adsorbent can be confirmed to be impregnated with desired iron oxide particles.

Also, as is apparent from the results of analysis of adsorption performance of the adsorbent according to the present invention depending on the kind of other inorganic ions in water, the case where $Na^+$ and $Ca^{2+}$ ions are present can be confirmed to exhibit superior adsorption performance compared to the case where the adsorbent is used alone.

Also, as is apparent from the results of analysis of the removal rate of the adsorbent according to the present invention able to remove natural organic matter (NOM) and BPA, it is confirmed that the NOM removal rate is higher by about 20% and also that the BPA removal rate is higher by about 20% compared to when using the single carbon adsorbent alone, resulting in an overall removal rate that amounts to 90%.

According to the present invention, an organic-inorganic composite hybrid adsorbent obtained by impregnating activated carbon nanopores with an oxide is effective at removing natural organic matter having high molecular weight as well as trace pollutants having low molecular weight in water, and can be recycled using a simple regeneration method and thus be reused. Also, the organic-inorganic composite hybrid adsorbent obtained by impregnating activated carbon nanopores with an oxide can be utilised not only in the water treatment field but also in the medical and food fields. Furthermore, the organic-inorganic composite hybrid adsorbent obtained by impregnating activated carbon nanopores with an oxide can be readily synthesized and so reduce the cost of operation, making it more feasible in actual applications.

BRIEF DESCRIPTION OF THE DRAWINGS

FIGS. 2A-2F. The SEM-EDS images of (a) PAC, (b) $Fe^{3+}$/PAC, (c) ferrihydrite, (d) ferrihydrite/PAC, (e) goethite, and (f) goethite/PAC;

FIG. 4. Adsorption isotherms of various adsorbents impregnated with iron oxides;

FIG. 7. Effects of NOM concentration on the BPA adsorption performance;

FIGS. 8A-8B. Equilibrium adsorption capacities of NOM onto various adsorbents in the (a) absence and (b) presence of BPA;

FIG. 9. Effects of NOM on BPA adsorption using ferrihydrite/PAC and PAC alone;

FIG. 10. Short-term performances of membrane filtration with the addition of PAC alone and ferrihydrite/PAC;

FIG. 11. Variations of the NOM removal efficiencies with time for the adsorbents impregnated with and without ferrihydrite; and FIG. 12. Variations of the BPA removal efficiencies with time for the adsorbents impregnated with and without ferrihydrite.

DESCRIPTION OF SPECIFIC EMBODIMENTS OF THE INVENTION

Figure 1A:
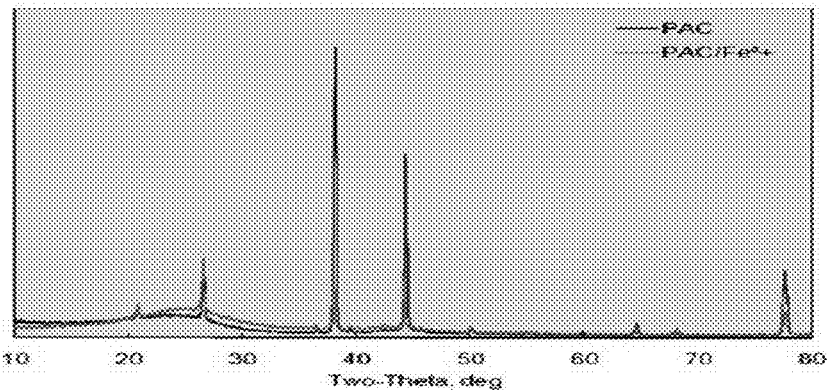
FIGS. 1A-1C. The XRD spectrums of (a) powdered activated carbon (PAC) and $Fe^{3+}$ impregnated PAC, (b) ferrihydrite and ferrihydrite impregnated PAC, and (c) goethite and goethite impregnated PAC.

A better understanding of the present invention may be obtained through the following examples which are set forth to illustrate, but are not to be construed to limit the present invention.

Example 1

Manufacture of Activated Carbon Impregnated with Ferrihydrite

In order to manufacture PAC impregnated with ferrihydrite, 2 g of PAC was placed in a polyethylene flask, added with 30 mL of 1M $Fe(NO_3).9H_2O$ solution, and allowed to stand for 1 hr. After one day, the activated carbon was dried at 40° C., titrated to pH 7-8 using 2 M NaOH, and centrifuged. Thereafter, the supernatant was decanted, and the precipitate was sufficiently washed until the electrolyte was completely removed therefrom, and then dried at 40° C., thus manufacturing PAC impregnated with ferrihydrite.

Example 2

Manufacture of Activated Carbon Impregnated with Goethite

The manufacture of PAC impregnated with goethite was carried out in such a manner that 2 g of PAC was placed in a polyethylene flask, added with 30 mL of 1M $Fe(NO_3).9H_2O$ solution, and allowed to stand for 1 hr. After one day, the activated carbon was separated from the solution, dried at 40° C., and titrated to pH 11-12 using 2 M NaOH. The titrated solution was immediately transferred into a 1 L polyethylene flask, diluted by the addition of deionized water up to the mark of the flask, and then allowed to stand at 70° C. for 60 hr. In this procedure, while reddish brown colored ferrihydrite particles were precipitated, they turned to yellowish brown colored goethite. Subsequently, the precipitate was washed several times, and dried at room temperature, thus manufacturing PAC impregnated with goethite.

Example 3

Manufacture of Activated Carbon Impregnated with Hematite

The manufacture of PAC impregnated with hematite was carried out in such a manner that 2 g of PAC was placed in a container, added with 30 mL of 1M $Fe(NO_3).9H_2O$ solution, and allowed to stand for 1 hr, as in the above iron oxide. After one day, the activated carbon was separated from the solution, dried at 40° C., and titrated to pH 6.5 using 2 M NaOH and 0.002 M oxalic acid. The titrated solution was allowed to stand at 90° C. for 36 hr. In this procedure, a 4.4 M imidazole buffer solution was added to prevent the pH from dropping. After completion of the reaction, the precipitate was dried at room temperature, thus manufacturing PAC impregnated with hematite.

Test Example 1

XRD Analysis

In order to evaluate crystallinity of iron oxide particles and activated carbons impregnated with iron oxides of Examples 1 through 3, XRD (X-ray Diffraction) patterns were analyzed using XRD. On the other hand, to analyze the XRD of only iron oxide particles, respective iron oxides were manufactured as follows.

To manufacture ferrihydrite, a $Fe(NO_3).9H_2O$ solution was prepared at a concentration of 5 g/L $Fe^{3+}$, placed in a polyethylene flask, and then titrated to pH 7-8 using 2 M NaOH. The precipitate produced during titration was centrifuged, after which the supernatant was decanted and the precipitate was dried at 40° C., thus manufacturing ferrihydrite.

To manufacture goethite, 30 mL of a $Fe(NO_3).9H_2O$ solution having 5 g/L $Fe^{3+}$ was placed in a polyethylene flask, titrated to pH 11-12 using 2 M NaOH and immediately transferred into a 1 L polyethylene flask, and deionized water was added up to the mark of the flask. Thereafter, in the course of the solution being allowed to stand at 70° C. for 60 hr, while reddish brown colored ferrihydrite particles were precipitated, they were converted into yellowish brown colored goethite. After 60 hr, the precipitate was washed several times and dried at room temperature, thus manufacturing goethite.

Hematite was manufactured from a $Fe(NO_3).9H_2O$ solution having 5 g/L $Fe^{3+}$. The solution in the container was titrated to pH 6.5 using 2 M NaOH and 0.002 M oxalic acid, and allowed to stand at 90° C. for 36 hr. In this procedure, a 4.4 M imidazole buffer solution was added to prevent the pH from dropping. After completion of the reaction for 36 hr, the precipitate was dried at room temperature, thus manufacturing hematite.

The adsorbents of Examples 1 through 3 and the above iron oxide particles were subjected to XRD. The results are shown in FIGS. 1(a)-(c).

FIG. 1 illustrates the XRD spectrums, wherein (a) shows PAC and PAC impregnated with $Fe^{3+}$, (b) shows ferrihydrite and PAC impregnated with ferrihydrite, and (c) shows goethite and goethite.

As illustrated in FIG. 1(a), in the case where PAC contained $Fe^{3+}$, 2θ corresponding to the specific peak was slightly shifted from 38.08 to 37.92 compared to the case where PAC was present alone, from which PAC and $Fe^{3+}$ were confirmed to be synthesized.

Figure 1B:
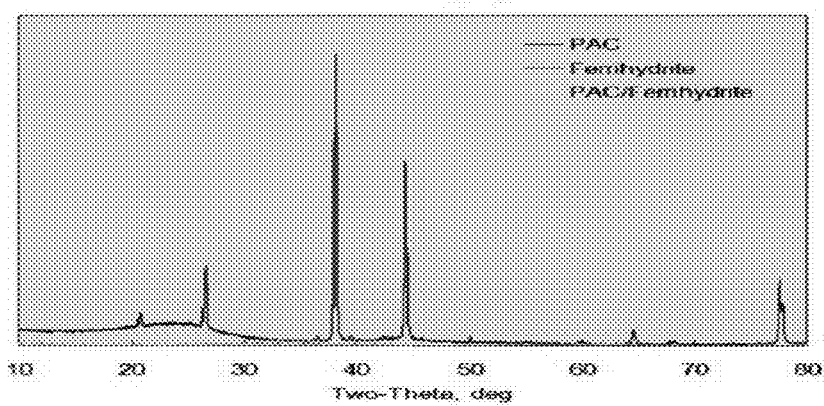
Figure 1C:
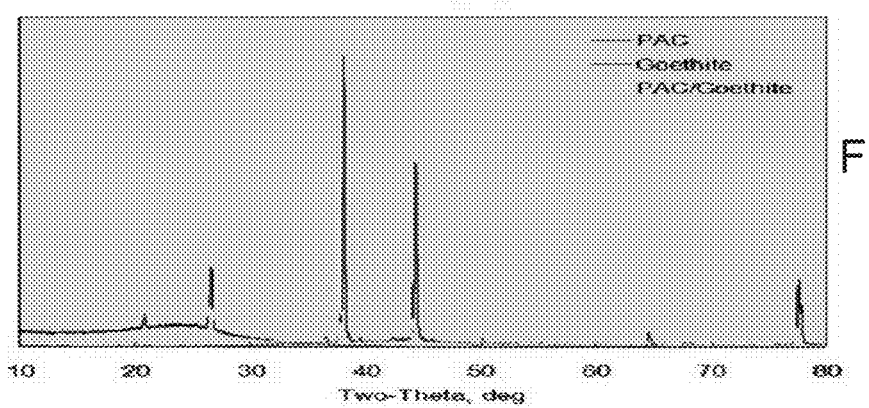

As illustrated in FIG. 1(b), when ferrihydrite alone was present, 2θ was 36.82, and when PAC was impregnated with ferrihydrite, 2θ was shifted to 36.56 by 0.26 leftward.

As illustrated in FIG. 1(c), when goethite alone was present, 2θ was 36.70, and when PAC was impregnated with goethite, 2θ was shifted to 36.41 by 0.29 leftward.

These results were confirmed to be due to interactions such as electron dipole coupling or Van der Waals forces between the respective iron oxide particles and PAC, from which the XRD spectrum showed that the pores of PAC were impregnated with desired iron oxide particles.

Test Example 2

SEM-EDS Analysis

In order to evaluate the shapes and components of the activated carbons impregnated with iron oxides of Examples 1 through 3 and the respective iron oxide particles of Test Example 1, they were analyzed using SEM (Scanning Electron Microscopy)-EDS (Energy Dispersive Spectroscopy). The results are shown in FIGS. 2(a)-(f).

FIG. 2 illustrates the SEM-EDS images, wherein (a) shows PAC, (b) shows $Fe^{3+}$/PAC, (c) shows ferrihydrite, (d) shows ferrihydrite/PAC, (e) shows goethite, and (f) shows goethite/PAC;

As is apparent from the tables of FIGS. 2(a)-(f) showing the components of respective compositions, a small amount of iron was contained in PACs impregnated with iron oxide particles, and the other components were similar to those of PACs. Thereby, it can be confirmed that iron oxide particles were not present on the surface of PAC but were attached to the inside of the pores of PAC.

Test Example 3

FT-IR Analysis

Figure 3A:
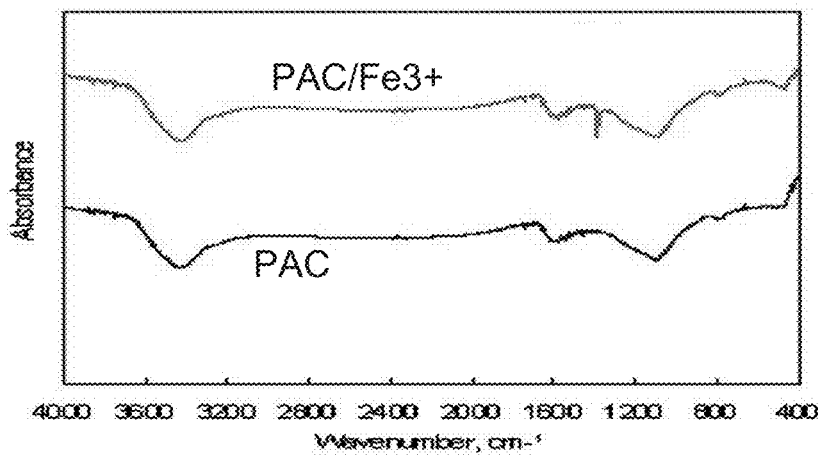
FIGS. 3A-3C. The FT-IR spectrums of (a) PAC and $Fe^{3+}$ impregnated PAC, (b) ferrihydrite and ferrihydrite/PAC, and (c) goethite and goethite/PAC.

In order to evaluate changes in chemical structure of the activated carbons impregnated with iron oxides of Examples 1 through 3 and the respective iron oxide particles of Test Example 1, they were analyzed using FT-IR (Fourier Transform-Infrared Spectroscopy). The results are shown in FIGS. 3(a)-(c).

FIG. 3 illustrates the FT-IR spectrums, wherein (a) shows PAC and PAC impregnated with $Fe^{3+}$, (b) shows ferrihydrite and ferrihydrite/PAC, and (c) shows goethite and goethite/PAC.

Figure 3B:
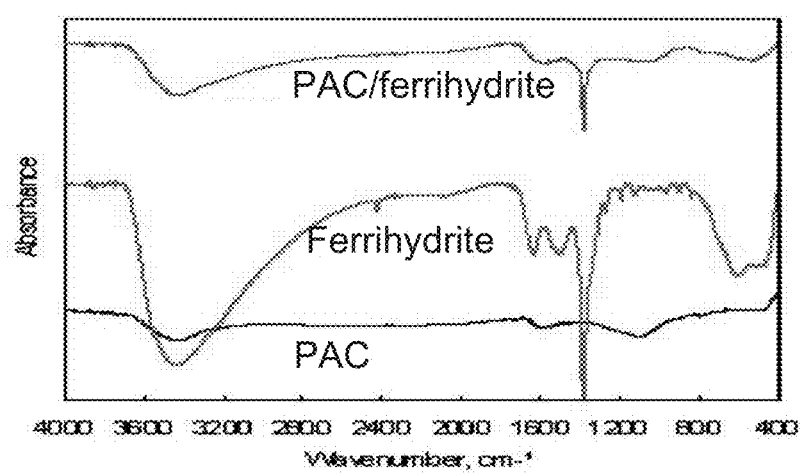

As illustrated in FIG. 3(b), the FT-IR spectrum of the PAC impregnated with ferrihydrite showed the distinct peak in the range of 342.29 $cm^{-1}$-3445.92 $cm^{-1}$ (—OH), and there were insignificant peaks in the range of 1000 $cm^{-1}$ or less, from which PAC was confirmed to be impregnated with ferrihydrite.

Figure 3C:
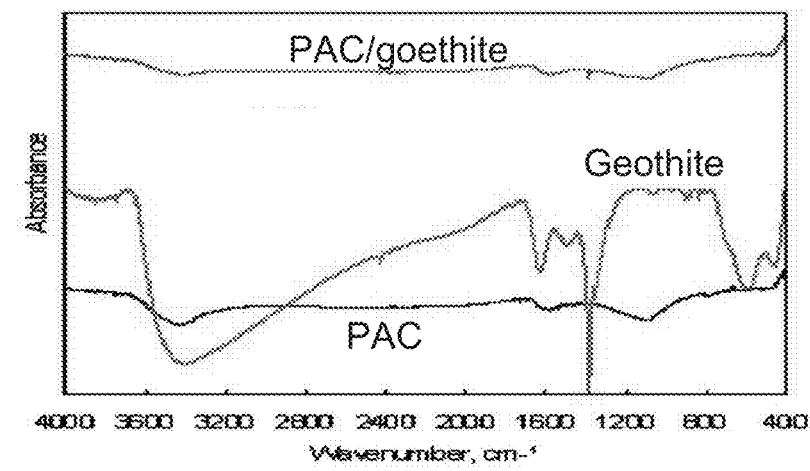

As illustrated in FIG. 3(c), the FT-IR spectrum of the PAC impregnated with goethite showed the distinct peaks at 3400.36 $cm^{-1}$ (—OH) and 1099.71 $cm^{-1}$, and the peak at 1348.18 $cm^{-1}$ was considered to be due to $NO_3^-$ remained in the sample, from which PAC was confirmed to be impregnated with goethite.

Test Example 4

Evaluation of Adsorption Isotherms of the Adsorbents Impregnated with Iron Oxide In order to evaluate the adsorption performance of the adsorbents impregnated with iron oxides of Examples 1 through 3, 5 mg of each adsorbent was added to 30 mL of raw water containing BPA in different amounts in the range of 1 ppb to 60 ppb under conditions of pH 7.0 and the resulting mixtures were stirred at 300 rpm and at 25° C. for 200 min. Thereafter, the adsorbent was removed using a 0.45-μm filter and the aqueous phase concentration was measured. The results are shown in FIG. 4 and Table 1 below. The adsorption performance of each adsorbent was evaluated using a Freundlich isotherm adsorption model. The equation is as follows.

$$q_e = K_F C_e^{1/n} \quad (1)$$

In this equation,
$q_e$=the amount of BPA adsorbed to the adsorbent in an equilibrium state, μg/g
$C_e$=equilibrium concentration, μg/L
$K_F$, 1/n=constant FIG. 4 illustrates the evaluation of isotherm adsorption of the adsorbent impregnated with iron oxide, wherein the adsorbed amount is 0.005 g/30 mL, and the BPA concentration is 1.0-100 ppb in 30 mL of the solution at pH 7.

As shown in Table 1, $K_F$ corresponding to the constant showing the adsorption performance of the adsorbent was in the sequence of PAC alone<hematite/PAC<magnetite/PAC<ferrihydrite/PAC, and had a correlation with the amount of iron ions present in the adsorbent. Such results were confirmed to be due to ligand exchange between the hydroxyl group on the surface of iron oxide present in PAC and the compound.

Moreover, PAC impregnated with iron oxide was confirmed to exhibit adsorption performance which is at least 50 times higher at the same equilibrium concentration (2 ppb) than that of only PAC, and is thus effective at controlling endocrine disruptors in water.

TABLE 1

| Type of adsorbent | Fe content g-Fe/g-PAC | BET results | | | Particle size, μm | Freundlich isotherm parameters | | |
| --- | --- | --- | --- | --- | --- | --- | --- | --- |
| | | Surface area, $m^2/g$ | Pore volume, cc/g | Pore size, nm | | $K_F$, [μg $g^{-1}$ ($dm^3 μg^{-1}$)$^{1/n}$] | 1/n | R |
| PAC alone | 6.0 × $10^{-3}$ | 628 | 0.707 | 4.50 | 30.2 | 94.1 | 0.303 | 0.974 |
| Ferrihydrite/PAC | 0.58 | 320 | 0.405 | 5.06 | 31.1 | 270 | 5.09 | 0.984 |
| Hematite/PAC | 0.42 | 600 | 0.687 | 4.58 | 30.8 | 119 | 1.71 | 0.982 |
| Magnetite/PAC | 0.53 | 488 | 0.635 | 5.20 | 32.8 | 187 | 2.09 | 0.975 |

Table 1 shows the adsorption characteristics of the PAC alone and the adsorbents impregnated with different iron oxides. In the case of PACs impregnated with iron oxides, the 1/n values were greater than 1, probably due to the interaction of BPA with iron oxide. In the case of PAC alone, the parameter was 0.303, which was smaller than 1 being dominated by the activated carbon alone. It was found that the interaction was considerably different from the cases of having impregnated iron oxides.

Test Example 5

Evaluation of BPA Adsorption Performance at Different Adsorbent Dosages

In order to evaluate the BPA adsorption performance depending on the dosage of adsorbents impregnated with iron oxides of Examples 1 through 3, 30 mL of a BPA solution having an initial concentration of 10 ppb was prepared and stirred at room temperature and 300 rpm at pH 7.0 for 200 min, and the equilibrium concentration and adsorption performance were compared and evaluated by using different adsorbent doses from 0.01 g to 1.0 g. The results are shown in Table 2.

TABLE 2

| Adsorbent dosage, g | $q_e$, μg/g | | |
|---|---|---|---|
| | PAC alone | Ferrihydrite/PAC | Hematite/PAC |
| 0.01 | 12.981 | 14.811 | 16.329 |
| 0.02 | 9.208 | 9.918 | 9.895 |
| 0.05 | 3.178 | 3.242 | 3.286 |
| 0.1 | 1.139 | 1.609 | 1.576 |
| 0.2 | 0.932 | 0.812 | 0.796 |
| 0.4 | 0.659 | 0.407 | 0.401 |
| 0.6 | 0.329 | 0.273 | 0.275 |
| 1.0 | 0.145 | 0.166 | 0.164 |

Table 2 shows changes in BPA adsorption performance depending on the adsorbent dosage. As the adsorbent dosage was higher, the equilibrium concentration was drastically lowered, and the adsorption capacity decreased.

Test Example 6

Evaluation of BPA Adsorption Performance Depending on pH

In order to evaluate BPA adsorption performance of the adsorbents impregnated with iron oxides of Examples 1 through 3 depending on pH, 20 mg of each adsorbent was added to 20 mL of a BPA solution having a concentration of 10 ppb, and the resulting mixtures were stirred at 25° C. at 300 rpm for 200 min, and the performance was evaluated depending on changes in pH from 3 to 12. The results are shown in FIG. 5.

Figure 5:
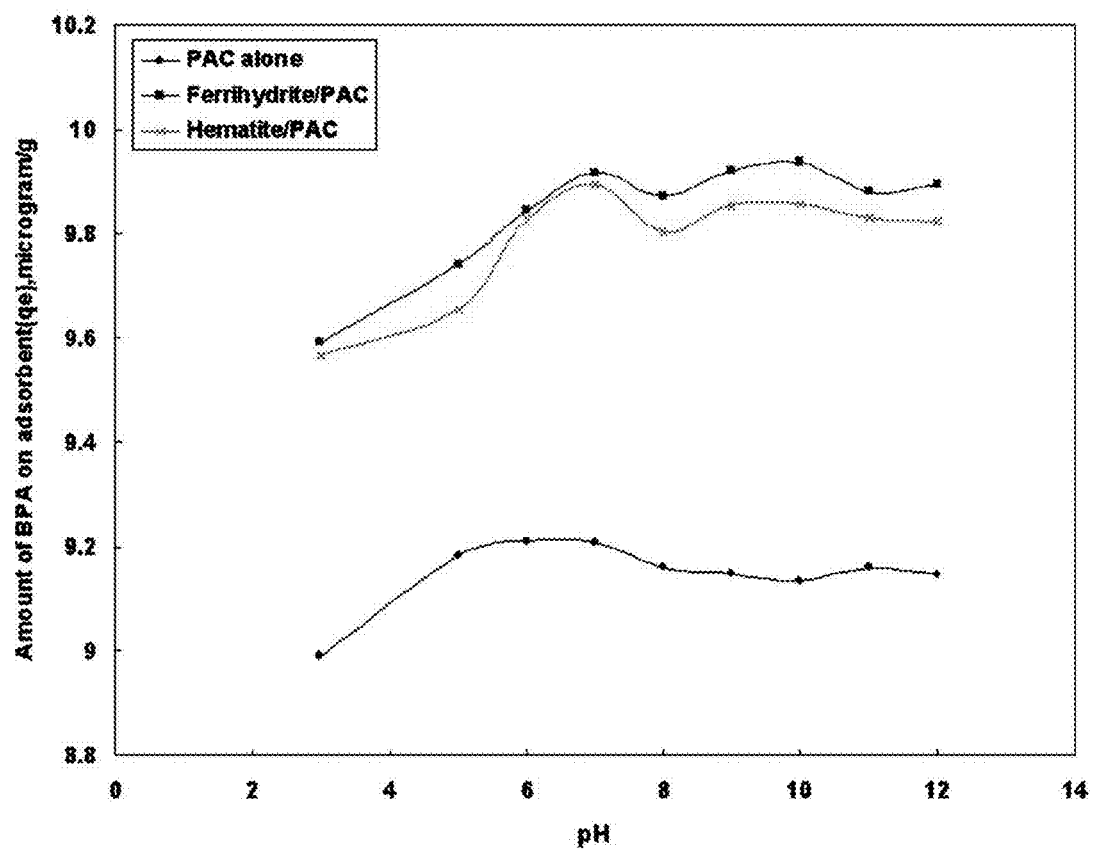
FIG. 5. Variations of the BPA adsorption capacity as a function pH.

FIG. 5 illustrates changes in BPA adsorption performance depending on pH, wherein the adsorbed amount is 0.02 g/30 mL, and the BPA concentration is 100 ppb in 30 mL of the solution at pH 3-12.

As illustrated in FIG. 5, the adsorption performance slightly decreased in proportion to an increase in pH in all the adsorbents. Thereby, when the pH of the mixture reached $pK_a$ (9.6-10.2) of BPA, BPA was converted into bisphenolate anions, and ion exchange performance deteriorated due to electrostatic repulsive force.

Test Example 7

Evaluation of Adsorption Performance Depending on Background Ions in Water

In order to evaluate BPA adsorption performance of the adsorbents impregnated with iron oxides of Examples 1 through 3 depending on the background ions in a large amount present in water, typical inorganic ions in natural water, that is, $Na^+$, $Mg^{2+}$ and $Ca^{2+}$ were selected and subjected to the following test. Specifically, 5 mg of each adsorbent was added to 30 mL of a 100 ppb BPA solution, and the resulting mixtures were stirred at room temperature at 300 rpm for 200 min and the concentration thereof was measured. Adsorption tests were conducted within the $Na^+$ concentration range of 0-1.0 M and the $Mg^{2+}$ and $Ca^{2+}$ concentration range of 0-0.1M. The results are shown in FIGS. 6(a)-(c).

FIG. 6 illustrates the BPA adsorption performance of the adsorbent impregnated with iron oxide depending on the type of inorganic ions, wherein (a) shows NaCl (0.0-1.0 mole/L), (b) shows $MgCl_2$ (0.0-0.15 mole/L), and (c) shows $CaCl_2$ (0.0-0.15 mole/L).

Figure 6A:
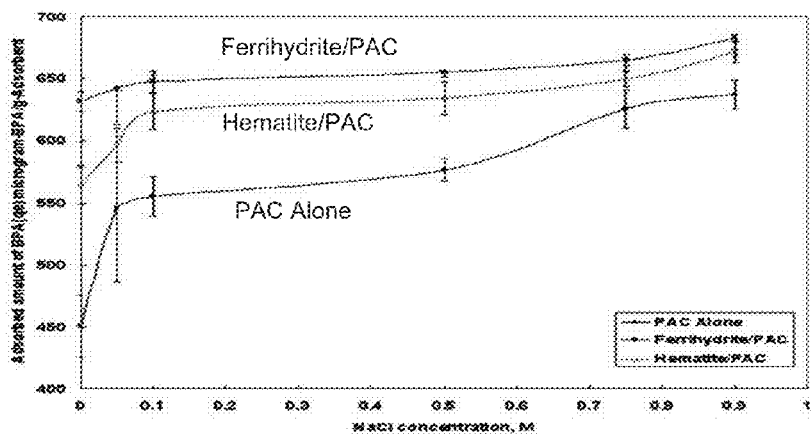
FIGS. 6A-6C. Effects of different background ions on the BPA adsorption performance of the adsorbents tested: (a) NaCl (0.0-1.0 mole/L), (b) $MgCl_2$ (0.0-0.15 mole/L), and (c) $CaCl_2$ (0.0-0.15 mole/L)
Figure 6B:
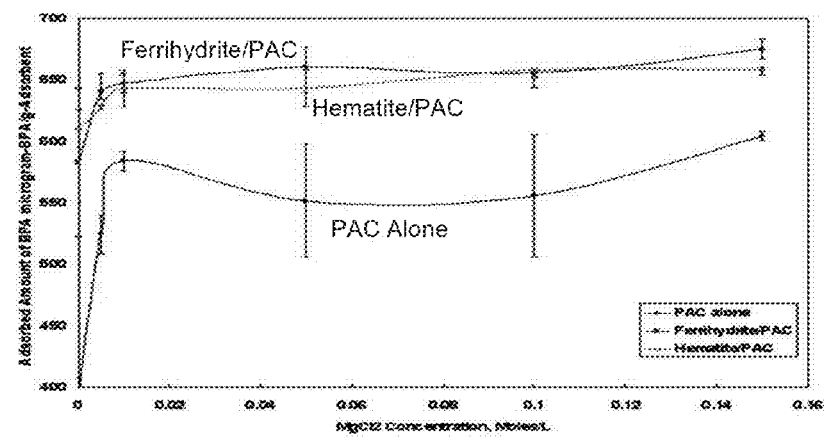
Figure 6C:
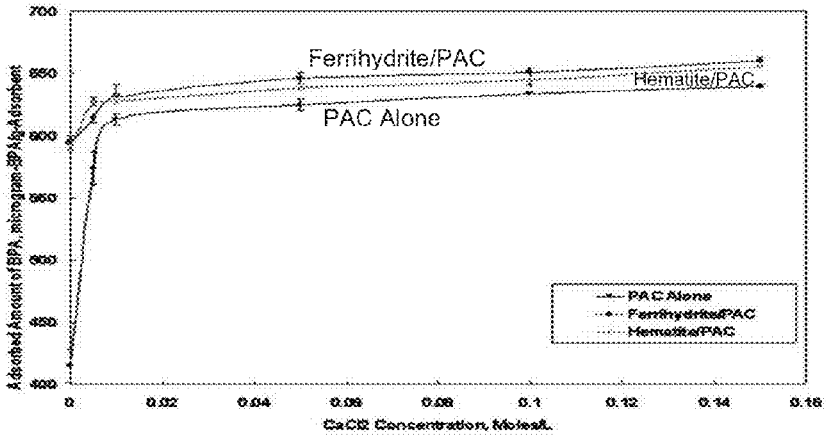

As illustrated in FIGS. 6(a)-(c), the adsorption performance was affected by the concentration of the salt in the very low salt concentration range, but reached a plateau when the concentration of the salt was higher than a certain level. Also, in the case where $Na^+$ and $Ca^{2+}$ ions were present, the adsorption capacity of the adsorbent impregnated with iron oxide was superior to that of PAC alone, thus exhibiting superior performance as compared to normal PAC.

Test Example 8

Evaluation of Effects of NOM on the Adsorption Performance

In order to evaluate the BPA adsorption performance of the adsorbents impregnated with iron oxides of Examples 1 through 3 with NOM present in natural water, changes in adsorption performance were analyzed in the presence of NOM at the concentration range of 0.1-3.5 ppm. Raw water was taken from D water plants in Daegu city, Korea, and the NOM concentration was changed in such a manner that raw water was concentrated and then diluted using a low-pressure RO membrane (salt rejection 96%) available from W, Korea. Also, in the case of samples containing BPA, 5 mg of each adsorbent was added to 30 mL of a BPA solution having an initial concentration of 100 ppb and then the adsorption test was conducted in the same manner as above. The results are shown in FIGS. 7, 8(a), (b) and 9.

FIG. 7 illustrates changes in BPA adsorption performance of the adsorbent impregnated with iron oxide depending on NOM, wherein the adsorbed amount is 0.005 g/30 mL, the BPA concentration is 100 ppb in 30 mL of the solution at pH 7, and the NOM concentration is 0.5-3.5 ppm.

FIG. 8(a) illustrates absorption performance of the adsorbent impregnated with iron oxide depending on NOM in the absence of BPA, and (b) illustrates absorption performance of the adsorbent impregnated with iron oxide depending on NOM in the presence of BPA.

As illustrated in FIGS. 7 and 8(a), (b), in the BPA adsorption performance of each adsorbent in the presence of NOM, the adsorption performance of the adsorbents impregnated with iron oxides was similar or increased in proportion to an increase in the concentration of NOM, but the BPA adsorption performance of PAC was remarkably decreased in proportion to an increase in the concentration of NOM.

Thus, in the case of PAC, it was confirmed that only adsorption by the surface area occurs, and not only BPA but also NOM are adsorbed and thus the area able to adsorb BPA may decrease, thus lowering the adsorption performance. However, in the case of adsorbents impregnated with iron oxides, it was confirmed that because additional adsorptive removal is possible via ion exchange or ligand exchange in addition to the surface adsorption, the adsorption performance may be maintained regardless of the increase in concentration of NOM.

FIG. 9 illustrates the BPA adsorption performance of ferrihydrite/PAC and PAC alone in a solution containing BPA alone, a mixture solution of BPA and NOM and a solution adsorbed with NOM and then with BPA to check interactions between NOM and BPA, wherein the adsorbed amount is 0.005 g/30 mL, the BPA concentration is 100 ppb in 30 mL of the solution at pH 7 and the NOM concentration is 1.85 ppm.

As illustrated in FIG. 9, in the case where BPA was added after NOM treatment, the removal rate was the greatest. This is because NOM adsorbed to the adsorbent provides sites able to re-adsorb BPA and also ion exchange and ligand exchange between iron oxide and BPA occur simultaneously. Moreover, even when PAC alone was present, the case where NOM and then BPA were sequentially adsorbed exhibited higher adsorption performance, which was confirmed to be due to the adsorption of BPA by NOM.

Test Example 9

Evaluation of Short-Term Operation Performance and of System Efficiency Depending on the Membrane Operation Modes An integrated water treatment system was constructed using the adsorbents impregnated with iron oxides of Examples 1 through 3, and the short-term operation performance thereof and the system efficiency depending on the type of membrane operation were evaluated. The results are shown in FIGS. 10, 11 and 12.

FIG. 10 illustrates the short-term operation performance of PAC alone and ferrihydrite/PAC and the system efficiency depending on the type of membrane operation.

As illustrated in FIG. 10, when PAC was added, transmembrane pressure (TMP) was drastically increased to 5 kPa, but when PAC impregnated with iron oxide was added, TMP was slightly increased, from which the PAC impregnated with iron oxide was confirmed to remove a larger amount of NOM from raw water and thus to decrease membrane fouling by a factor of 2.

FIG. 11 illustrates the NOM removal rate of the adsorbent impregnated with iron oxide, and FIG. 12 illustrates the BPA removal rate of the adsorbent impregnated with iron oxide.

As is apparent from the results of analysis of the NOM and BPA removal rates of the continuous system as seen in FIGS. 11 and 12, the NOM removal rate of the adsorbent impregnated with iron oxide was higher by about 20% than that of PAC alone. Also, the BPA removal rate of the adsorbent impregnated with iron oxide was higher by about 20% than that of PAC alone, and thereby the removal rate amounted to 90%. Accordingly, the adsorbent impregnated with iron oxide can be confirmed to be suitable for the removal of endocrine disruptors using a low-pressure membrane process.

The invention claimed is:

1. A method of manufacturing an adsorbent comprising a porous adsorbent and ferrihydrite, goethite, hematite or magnetite impregnated into nanopores of the porous adsorbent, the method comprising:
    a) allowing a porous adsorbent to stand in a ferric solution;
    b) separating the porous adsorbent from the solution;
    c) washing the porous adsorbent;
    d) exposing the porous adsorbent to an alkaline solution so that a precipitate is formed in the pores of the porous adsorbent; and
    e) recovering the adsorbent, and performing heat treatment, washing and drying,
    thereby manufacturing the adsorbent comprising a porous adsorbent and ferrihydrite, goethite, hematite or magnetite impregnated into nanopores of the porous adsorbent.

2. The method of claim 1, wherein the heat treatment is performed in a temperature range from room temperature to 90° C. in the presence of water.

3. A water treatment method using the adsorbent manufactured by the method of claim 1.

4. The water treatment method of claim 3, wherein the water treatment is conducted in the presence of NOM (Natural Organic Matter), $Na^+$, $Mg^{2+}$, $Ca^{2+}$ or a combination thereof.

* * * * *